United States Patent
Panciroli

(10) Patent No.: US 8,612,122 B2
(45) Date of Patent: Dec. 17, 2013

(54) METHOD FOR CONTROLLING THE SPEED OF AN INTERNAL COMBUSTION ENGINE SUPERCHARGED BY MEANS OF A TURBOCHARGER

(75) Inventor: Marco Panciroli, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 325 days.

(21) Appl. No.: 13/246,559

(22) Filed: Sep. 27, 2011

(65) Prior Publication Data
US 2012/0109492 A1 May 3, 2012

(30) Foreign Application Priority Data
Sep. 27, 2010 (IT) ................ BO2010A0580

(51) Int. Cl.
*F02B 33/00* (2006.01)
*F02B 33/02* (2006.01)

(52) U.S. Cl.
USPC ........................ 701/110; 123/559.1

(58) Field of Classification Search
USPC .......... 701/100, 102; 123/559.1, 564; 60/598, 60/602, 605.1, 624
See application file for complete search history.

(56) References Cited

U.S. PATENT DOCUMENTS

| | | | |
|---|---|---|---|
| 5,829,254 A | 11/1998 | Hayashi et al. | |
| 6,155,050 A | 12/2000 | Blanz et al. | |
| 6,298,718 B1 | 10/2001 | Wang | |
| 2007/0033936 A1* | 2/2007 | Panciroli | ........................ 60/602 |
| 2009/0293477 A1 | 12/2009 | Shu et al. | |

FOREIGN PATENT DOCUMENTS

| | | |
|---|---|---|
| EP | 1741895 A1 | 1/2007 |
| EP | 2014894 A1 | 1/2009 |
| WO | 03/071111 A1 | 8/2003 |

OTHER PUBLICATIONS

Mar. 16, 2011 Search Report for Italian Patent App. No. B02010A000580.

* cited by examiner

*Primary Examiner* — Mahmoud Gimie
(74) *Attorney, Agent, or Firm* — Howard & Howard Attorneys PLLC

(57) ABSTRACT

A method controls an internal-combustion engine (1) supercharged by a turbocharger (12) and including a turbine (13) and compressor (14). The control method comprises steps of determining a current reduced-mass-flow rate (QAHR) of the compressor (14), determining a safety threshold (Mmax_turbo) of the reduced-mass-flow rate (QAHR) that delimits in a "reduced-mass-flow rate/compression ratio" plane an area substantially close to achievement of sonic conditions, and imposing that the reduced-mass-flow rate (QAHR) has to be lower than a safety threshold (Mmax_turbo) of the reduced-mass-flow rate (QAHR).

3 Claims, 6 Drawing Sheets

Figure 1:
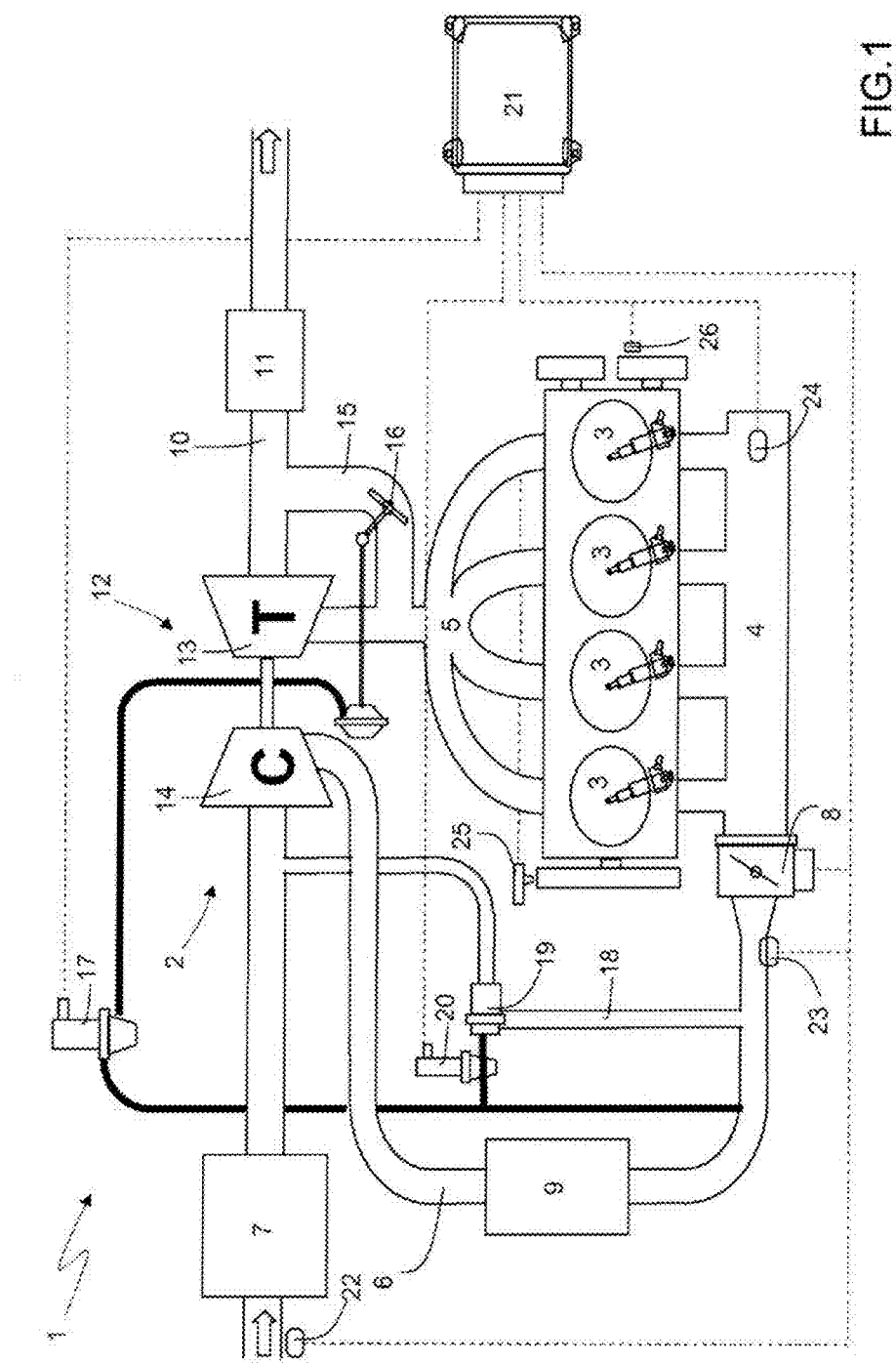

METHOD FOR CONTROLLING THE SPEED OF AN INTERNAL COMBUSTION ENGINE SUPERCHARGED BY MEANS OF A TURBOCHARGER

REFERENCE TO RELATED APPLICATION

This application claims benefit of the filing date of and priority to Italian Patent Application BO2010A 000580 filed on Sep. 27, 2010.

BACKGROUND OF INVENTION

1. Field of Invention

The invention relates, generally, to a method for controlling an internal-combustion engine and, more particularly, to such an engine that is supercharged by a turbocharger.

2. Description of Related Art

Some internal-combustion engines are provided with a turbocharger-supercharging system, which can increase the power generated by the engine using the enthalpy of the exhaust gases to compress the intake air from the engine and, therefore, increase the volumetric efficiency of the intake.

A turbocharger-supercharging system includes a turbocharger provided with a turbine, which is arranged along an exhaust conduit to rotate at high speed under the pressure of exhaust gases expelled from the engine, and compressor, which is put in rotation by the turbine and arranged along the air-supply conduit compressing the intake air from the engine.

In particular, the useful area of the operating range is limited—on the left side of a "reduced-mass-flow rate/compression ratio" plane by the "pumping" line and at the right side of the same plane by the so-called "saturation" line. The "pumping" line, therefore, defines a first "forbidden" zone and consists of the location of points where the internal aerodynamic balance of the compressor is offset and there is a periodical, noisy, and violent flow-rate refusal to the mouth, with effects that can be destructive for the blading.

In a turbocharger-supercharging system, it is necessary to maintain the operating range of the turbocharger within a useful area dependent on the engine point both for functional reasons (i.e., to avoid malfunctions or else low performance), and structural reasons (i.e., to avoid damage to the turbocharger).

For example, Patent Application US-A1-2009293477 describes a control method of an internal-combustion engine supercharged by a turbocharger including a turbine and compressor. The control method envisages determining the current mass-flow rate of the compressor, determining a lower security threshold of the mass-flow rate, and requiring that the current mass-flow rate of the compressor be greater than the security threshold of the mass-flow rate. Patent Application US-A1-2009293477, therefore, describes a method that allows preventing damage to the turbocharger, but does not allow optimizing the performance of the turbocharger itself.

Patent Application EP1741895A1 describes a control method of an internal-combustion engine supercharged by a turbocharger including a compressor, a turbine adapted to drive into rotation the compressor under the action of the exhaust gases of the engine, and a waste-gate valve adapted to regulate the flow of exhaust gases supplied as input to the turbine for controlling the speed of rotation of the turbine itself according to an output supercharged-target pressure required by the compressor.

The control method described in Patent Application EP1741895A1 includes the steps of: measuring the pressure of intake air entering the compressor; determining the mass-flow rate of the compressor; calculating—through a predetermined map that characterizes the operation of the compressor and, according to the preset-limit speed of rotation, measured air pressure and mass-flow rate—a supercharging-limit pressure, which is related to the obtainable output-air pressure from the compressor when the turbine rotates at a speed substantially equal to the preset-limit speed; verifying if a requested supercharged-target pressure satisfies a preset relation with a supercharged-limit pressure calculated in the case where the relationship is met, and actuating the waste-gate valve for controlling the speed of rotation of the turbine according to the supercharged-limit pressure, thus reducing the rotational speed of the turbocharger at a value substantially equal to the preset-limit speed.

Patent Application EP1741895A1 indicates that, in supercharging systems of the above-described type, it is necessary to be able to limit, at the varying of operating conditions of the engine, the maximum rotation speed of the turbocharger both for functional and structural reasons so as to avoid critical operating conditions that may cause damage to the turbocharger. However, it gives no indication on how to implement the limitation of the maximum rotation speed of the turbocharger.

Patent Application EP2014894A1 describes instead a control method of an internal-combustion engine supercharged by a turbocharger provided with a turbine and compressor that envisages providing in a "Reduced-Mass-Flow Rate/Compression Ratio" plane at least one "operating limit" curve, at least one "interaction" curve of a waste-gate valve regulating a bypass conduit of the turbine, and at least one "intervening" curve of a Poff valve regulating a bypass conduit of the compressor. The control method according to Patent Application EP2014894A1 envisages the use of the "operating limit" curve for limiting the pressure target downstream of the compressor used by the motor control. The method further envisages controlling the opening of the waste-gate valve if the "intervening" curve of the waste-gate valve is exceeded and Poff valve if the "intervening" curve of the Poff valve is exceeded. The control method described by Patent Application EP2014894A1 is able to ensure that the operating range of the turbocharger remains within the useful area in any working condition of the internal-combustion engine.

The so-called "saturation" line defines a second "forbidden" zone, corresponds to the reaching of sonic conditions (and consequent blocking of the flow) entering the turbine, and defines the maximum possible flow that the compressor can provide in the given conditions of the intake environment. Substantially close to the "saturation" line, the turbocharger reaches, therefore, very high speeds and is able to develop the maximum power for compressing air intake from the engine and, thus, increasing the volumetric efficiency of the aspiration. Unfortunately, however, substantially close to the "saturation" line, due to the high speeds involved, it may occur that the turbocharger accelerates out of control until reaching the sonic block, with destructive effects upon the turbocharger itself.

Thus, there is a need in the related art for a control method of an internal-combustion engine supercharged by a turbocharger. More specifically, there is a need in the related art for such a method that is inexpensive and simple to implement. There is a need in the related art for such a method that also ensures that the operating range of the turbocharger remains within the useful area substantially close to the "saturation" line, but without reaching the sonic block.

SUMMARY OF INVENTION

The invention overcomes the disadvantages in the related art in a method for controlling an internal-combustion engine supercharged by a turbocharger and including a turbine and compressor. The control method includes steps of determining a current reduced-mass-flow rate of the compressor, determining a safety threshold of the reduced-mass-flow rate that delimits in a "reduced-mass-flow rate/compression ratio" plane an area substantially close to achievement of sonic conditions, and imposing that the reduced-mass-flow rate has to be lower than a safety threshold of the reduced-mass-flow rate.

One advantage of the method for controlling an internal-combustion engine supercharged by a turbocharger of the invention is that it is inexpensive and simple to implement.

Another advantage of the method for controlling an internal-combustion engine supercharged by a turbocharger of the invention is that it does not use a high computing power of the electronic-control unit.

Another advantage of the method for controlling an internal-combustion engine supercharged by a turbocharger of the invention is that it does not require the installation of additional components (in particular, sensors or actuators) with respect to those already present in a modern internal-combustion engine.

Another advantage of the method for controlling an internal-combustion engine supercharged by a turbocharger of the invention is that it ensures that the operating range of the turbocharger remains within the useful area substantially close to the "saturation" line, but without reaching the sonic block.

Other objects, features, and advantages of the method for controlling an internal-combustion engine supercharged by a turbocharger of the invention are readily appreciated as the control method becomes more understood while the subsequent detailed description of at least one embodiment of the control method is read taken in conjunction with the accompanying drawing thereof.

BRIEF DESCRIPTION OF EACH FIGURE OF DRAWING

Figure 2:
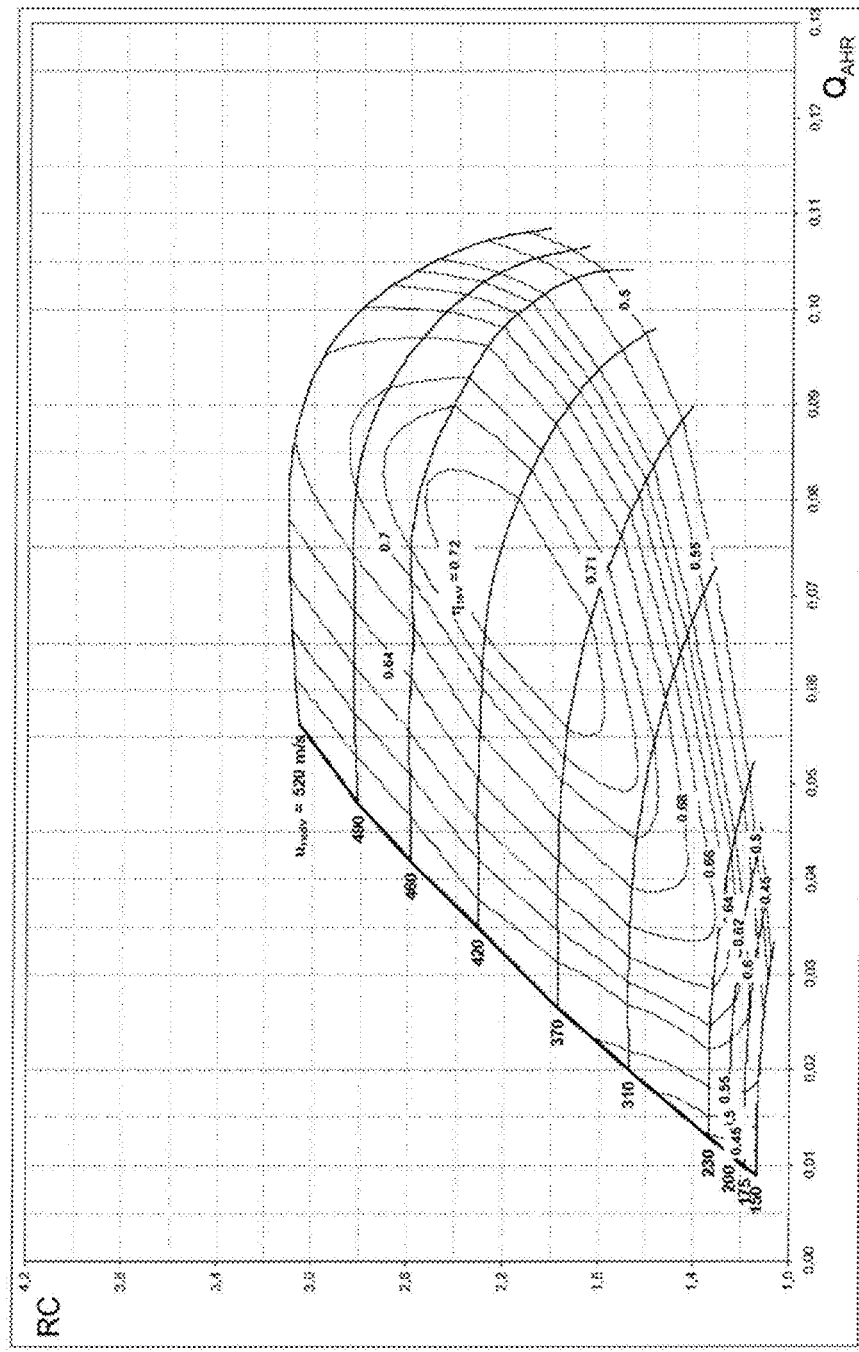

FIG. 1 diagrammatically shows an internal-combustion engine supercharged by a turbocharger and provided with an electronic-control unit that implements a method for controlling the engine according to an embodiment of the invention;

FIG. 2 shows "characteristic" curves of a compressor of the turbocharger diagrammatically shown in FIG. 1 on a "Reduced-Mass-Flow Rate/Compression Ratio" plane; and FIGS. 3-6 show a "Reduced-Mass-Flow Rate/Compression Ratio" plane that illustrates "limit of operation" and "intervening" curves used in the embodiment of the method for controlling an internal-combustion engine supercharged by a turbocharger of the invention implemented by the electronic-control unit diagrammatically shown in FIG. 1.

DETAILED DESCRIPTION OF EMBODIMENT(S) OF INVENTION

In FIG. 1, an internal-combustion engine, generally indicated at 1, is supercharged by a turbocharger-supercharging system 2. The internal-combustion engine 1 has four cylinders 3, each of which is connected to an intake manifold 4 by way of at least one respective intake valve (not shown) and exhaust manifold 5 by way of at least one respective exhaust valve (not shown). The intake manifold 4 receives fresh air (i.e., air coming from the external environment) through a suction conduit 6, which is provided with an air filter 7 and regulated by a throttle valve 8. Along the suction conduit 6, an intercooler 9 is provided a function of which is to cool the intake air. To the exhaust manifold 5 is connected an exhaust conduit 10 that feeds the exhaust gases produced by the combustion to an exhaust system, which emits the gases produced from burning into the atmosphere and usually includes at least one catalyst 11 and at least one silencer (not shown) disposed downstream of the catalyst 11.

The supercharged system 2 of the internal-combustion engine 1 includes a turbocharger 12 provided with a turbine 13 that is arranged along the exhaust conduit 10 to rotate at high speed under the action of exhaust gases expelled from the cylinders 3 and a compressor 14 that is arranged along the suction conduit 6 and is mechanically connected to the turbine 13 to be driven into rotation by the turbine 13 itself so as to increase the air pressure fed into the supply conduit 6.

Along the exhaust conduit 10 a bypass conduit 15 is provided, which is connected in parallel to the turbine 13 so as to present its ends connected upstream and downstream of the turbine 13 itself. Along the bypass conduit 15 a waste-gate valve 16 is arranged, which is adapted to regulate the flow of exhaust gases flowing through the bypass conduit 15 and is driven by an actuator 17. Along the intake conduit 6 a bypass conduit 18 is provided, which is connected in parallel with the compressor 14 so as to present its ends connected upstream and downstream of the compressor 14 itself. Along the bypass conduit 18 a Poff valve 19 is arranged, which is adapted to regulate the flow of exhaust gases flowing through the bypass conduit 18 and is driven by an actuator 20.

The internal-combustion engine 1 is controlled by an electronic-control unit 21, which directs the operation of all components of the internal-combustion engine 1 including the supercharging system 2. In particular, the electronic-control unit 21 drives the control actuators 17, 20 of the waste-gate valve 16 and of the Poff valve 19. The electronic-control unit 21 is connected to sensors 22 that measure the temperature $T_o$ and pressure $P_o$ along the intake conduit 6 upstream of the compressor 14, to sensors 23 that measure temperature and pressure along the suction conduit 6 upstream of the throttle valve 8, and to sensors 24 that measure temperature and pressure inside the suction manifold 4. In addition, the electronic-control unit 21 is connected to a sensor 25 that measures the angular position (and hence the rotation speed) of a crankshaft of the internal-combustion engine 1 and a sensor 26 that measures the phase of the intake and/or discharge valves. There are no provided sensors adapted for measuring the rotation speed of the turbocharger 12.

Among other things, the electronic-control unit 21 maintains the operating range of the turbocharger 12 within a useful area. The following shows the control mode used by the electronic-control unit 21 to keep the operating range of the turbocharger 12 in a useful area and to prevent the turbocharger 12 from reaching sonic conditions in the vicinity of a "saturation" line 35 (illustrated in FIGS. 4 and 5).

During a phase of design and development of the internal-combustion engine 1, the characteristic curves of the compressor 14 are analyzed (provided by the manufacturer of turbocharger 12) in a "Reduced-Mass-Flow Rate/Compression Ratio" plane. An example of the characteristic curves of a commercial compressor 14 is illustrated in FIG. 2.

The characteristic curves shown in FIG. 2 are normalized to an absolute reference temperature $T_{o\_rif}$ and an absolute reference pressure $P_{o\_rif}$. On the left side of the "Reduced-Mass-Flow Rate/Compression Ratio" plane is a first "forbidden" zone delimited by the "pumping" line, consisting of the location of points wherein the inside aerodynamic balance of the compressor 14 is offset and there is a periodical, noisy and violent flow refusal to the mouth, with effects that can be destructive for the blading.

Instead, in the right side of the "Reduced-Mass-Flow Rate/Compression Ratio" plane there is a second "forbidden" zone delimited by the so-called "saturation" line 35 (shown in FIGS. 4 and 5), which corresponds to the attainment of sonic conditions (and, thus, blocking the flow) at the entrance of the turbine 13 and defines the maximum possible flow that the compressor 14 can provide in the given conditions of the suction environment.

Figure 3:
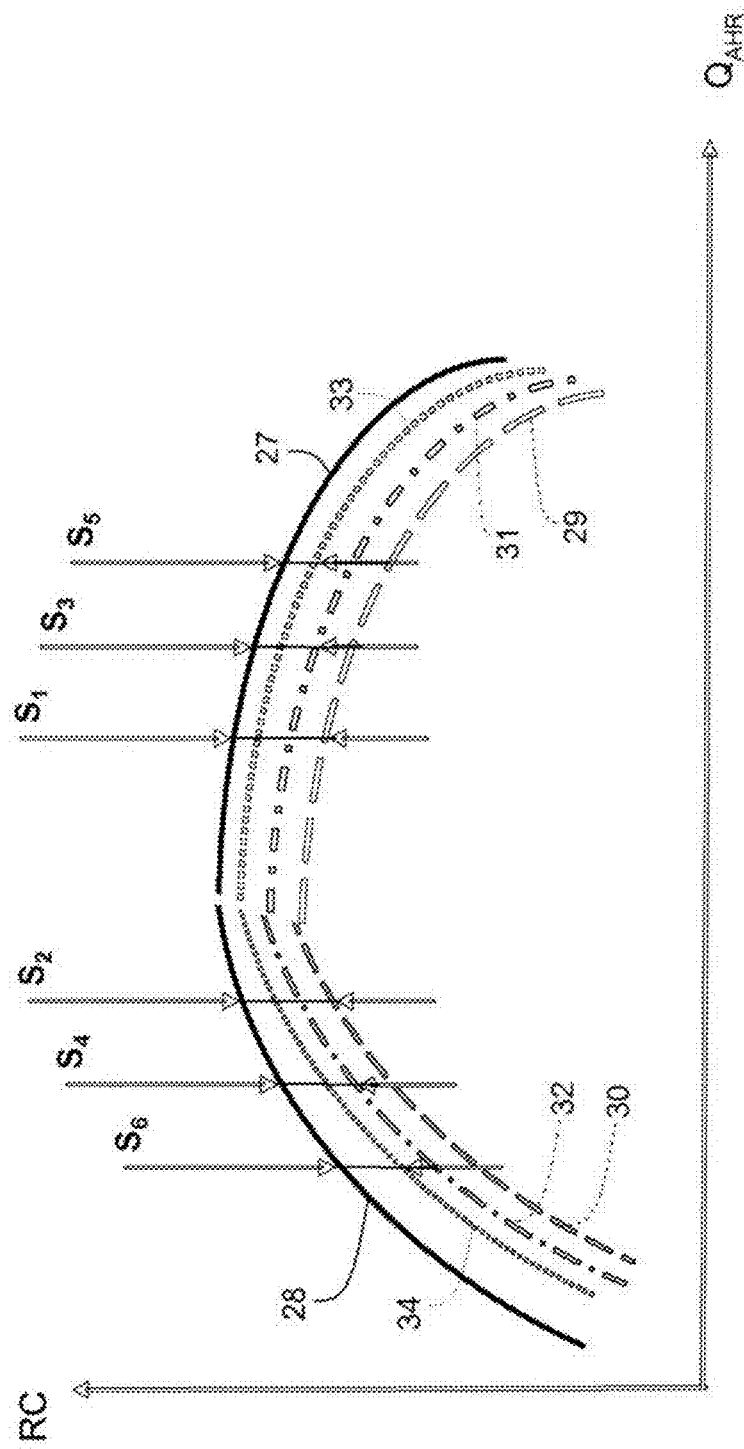

According to that shown in FIG. 3, through an analysis of the characteristic curves of the compressor 14 a curve 27 is determined limiting the rotation speed of the turbocharger 12 and a curve 28 that delimits the pumping of the turbocharger 12. According the curves 27, 28 two "operating limit" curves 29, 30 are established that are used to restrict the target of pressure downstream of the compressor 14 used by the engine control. For determining the "operating limit" curve 29 a threshold S1 (constant or variable) is determined establishing the distance between the "operating limit" curve 29 and the curve 27 that limits the rotation speed of the turbocharger 12; similarly, to determine the "operating limit" curve 30 a threshold S2 (constant or variable) is determined establishing the distance between the "operating limit" curve 30 and the curve 28, which delimits the pumping of the turbocharger 12.

Moreover, according to the curves 27, 28 two "intervening" curves 31, 32 are established of the waste-gate valve 16 regulating the bypass conduit 15 of the turbine 13 and two "intervening" curves 33, 34 of the Poff valve 19 that regulates the bypass conduit 18 of the compressor 14. To determine the "intervening" curve 31 of the waste-gate valve 16 a threshold $S_3$ (constant or variable) is determined establishing the distance between the "operating limit" curve 29 and the "intervening" curve 31 of the waste-gate valve 16; similarly, to determine the "intervening" curve 32 of the waste-gate valve 16 a threshold $S_4$ (constant or variable) is determined establishing the distance between the "intervening" curve 32 of the waste-gate valve 16, and the curve 28, which delimits the pumping of the turbocharger 12. To determine the "intervening" curve 33 of the Poff valve 19 a threshold $S_5$ (constant or variable) is determined establishing the distance between the "operating limit" curve 29 and the "intervening" curve 33 of the Poff valve 19; similarly, to determine the "intervening" curve 34 of the Poff valve 19 a threshold $S_6$ (constant or variable) is determined establishing the distance between the "intervening" curve 34 of the Poff valve 19 and the curve 28, which delimits the pumping of the turbocharger 12.

During operation of the internal-combustion engine 1, the electronic-control unit 21 uses the "operating limit" curves 29, 30 to limit the pressure target downstream of the compressor 14 used by the engine control. In other words, the engine control unit implemented in the electronic-control unit 21 determines in a known way and as a function of the engine point, a target pressure downstream of the compressor 14, which represents a desired and optimal pressure value downstream of the compressor 14. If the target pressure downstream of the compressor 14 is compatible with the "operating limit" curves 29, 30 then the target pressure downstream of the compressor 14 is maintained, otherwise if the target pressure downstream of the compressor 14 is not compatible with "operating limit" curves 29, 30 then the target pressure downstream of the compressor 14 is limited to a maximum value compatible with the "operating limit" curves 29, 30.

In particular, to limit the target pressure downstream of the compressor 14 the reduced-mass-flow rate $Q_{AH}$ of the compressor 14 is determined, according to the current reduced-mass-flow rate $Q_{AH}$ of the compressor 14 the maximum possible compression ratio RC is determined by using the "operating limit" curves 29, 30, the maximum possible pressure is determined downstream of the compressor 14 by multiplying the absolute pressure $P_o$ upstream of the compressor 14 for the maximum possible compression ratio RC, and the target pressure downstream of compressor 14 is limited to the maximum possible pressure downstream of the compressor 14 if the target pressure downstream of the compressor 14 is greater than the possible maximum pressure downstream of the compressor 14.

The reduced-mass-flow rate $Q_{AHR}$ of the compressor 14 is determined using the following equation:

$$Q_{AHR} = Q_{AH} \cdot \sqrt{\frac{T_o}{T_{orif}}} \cdot \frac{P_{orif}}{P_o}$$

wherein
$Q_{AH}$=mass-flow rate of the compressor 14;
$Q_{AHR}$=reduced-mass-flow rate of the compressor 14;
$T_o$=absolute temperature upstream of the compressor 14;
$P_o$=absolute pressure upstream of the compressor 14;
$T_{o\_rif}$=absolute reference temperature; and
$P_{o\_rif}$=absolute reference pressure.

The absolute reference temperature $T_{o\_rif}$ and the absolute reference pressure $P_{o\_rif}$ are the conditions in which were derived characteristic curves of the compressor 14 and, therefore, of the curves 27-34 and are project data known in advance. The absolute temperature $T_o$ upstream of the compressor 14 and the absolute pressure $P_o$ upstream of the compressor 14 are measured by sensors 22. The mass-flow rate $Q_{AH}$ of the compressor 14 can be measured by a specifically dedicated flow rate sensor or can be estimated in a known way by the electronic-control unit 21.

According to a different embodiment not illustrated, the measure of the absolute temperature $T_o$ upstream of the compressor 14 (i.e., substantially room temperature) may not be provided; in this case the reduced-mass-flow rate $Q_{AHR}$ can be "partially" normalized on the basis of the relation between the pressure $P_o/P_{o\_rif}$ without taking into account the relation between the temperatures $T_o$ and $T_{o\_rif}$.

The curves 28, 30, 32, 34 are independent from the reduced limit speed $N_{tcR}$ of the turbocharger 12, while the curves 27, 29, 31, 33 are dependent on the reduced limit speed $N_{tcR}$ of the turbocharger 12 (i.e., vary at the varying of the reduced limit speed $N_{tcR}$ of the turbocharger 12). In other words, for the turbocharger 12 is set a limit speed $N_{tc}$ preset by the turbocharger 12 above which the turbocharger 12 is brought in a critical condition; using the preset-limit speed $N_{tc}$ of the turbocharger 12 the current reduced limit speed $N_{tcR}$ of the turbocharger 12 is calculated on the basis of the absolute temperature $T_o$ upstream of the compressor 14 using the following equation:

$$N_{tcR} = N_{tc} \cdot \sqrt{\frac{T_{orif}}{T_o}}$$

wherein $N_{tc}$=limit speed of turbocharger 12;
$N_{tcR}$=reduced limit speed of turbocharger 12;
$T_o$=absolute temperature upstream of the compressor 14; and
$T_{o\_rif}$=absolute reference temperature.

At the varying of the absolute temperature $T_o$ upstream of the compressor 14 and at the same preset-limit speed $N_{tc}$ of the turbocharger 12 the current reduced limit speed $N_{tcR}$ of the turbocharger 12 varies; therefore, the electronic-control unit 21 cyclically determines according to the absolute temperature $T_o$ upstream of the compressor 14 and according to the preset-limit speed $N_{tc}$ of the turbocharger 12 (which always remains constant) the current reduced limit speed $N_{tcR}$ of the turbocharger 12 and according to the current reduced limit speed $N_{tcR}$ of the turbocharger 12 is able to determine the curves 27, 29, 31, 33 to be used. Alternatively, since the preset-limit speed $N_{tc}$ of the turbocharger 12 is constant to simplify the management of the curves 27, 29, 31. 33, the curves 27, 29, 31, 33 themselves may be stored in the electronic-control unit 21 and parameterized according to the absolute temperature $T_o$ upstream of the compressor 14; in this way, the electronic-control unit 21 does not need to calculate the current reduced limit speed $N_{tcR}$ of the turbocharger 12 and, therefore, choose the curves 27, 29, 31, 33 to be used, but simply needs to update the curves 27, 29, 31, 33 as a function of the absolute temperature $T_o$ upstream of the compressor 14.

According to another simplified embodiment (and, therefore, less accurate), instead of using the current reduced-mass-flow rate $Q_{AHR}$ the current mass-flow rate $Q_{AH}$ (not reduced) or the target mass-flow rate $Q_{AHR}$ (reduced or not reduced) could be used.

Figure 4:
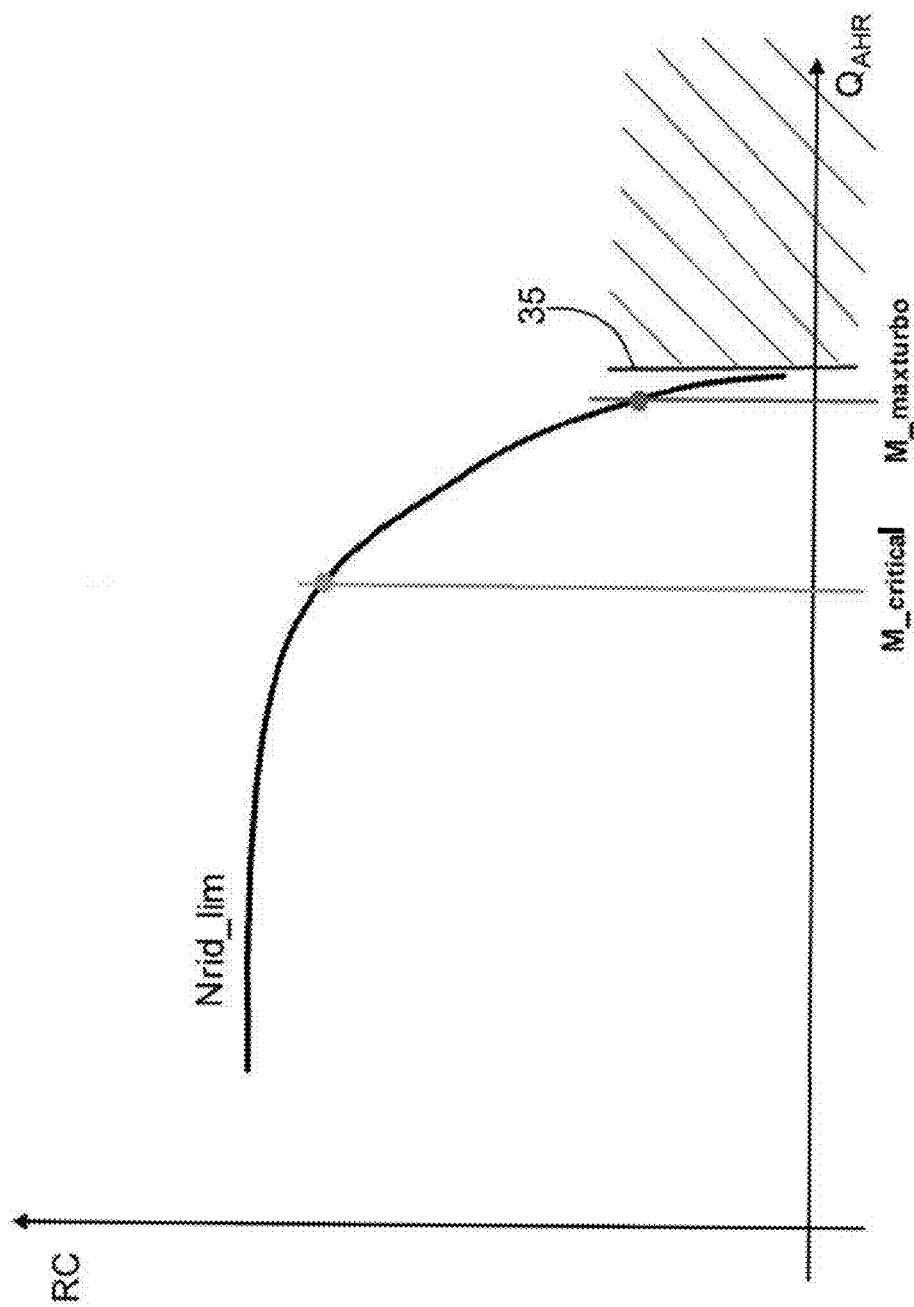

Once determined, the current reduced limit speed $N_{tcR}$, the electronic-control unit 21 is prepared to determine a critical threshold $M_{critica}$ of the reduced-mass-flow rate $Q_{AHR}$. As best illustrated in FIG. 4, said critical threshold $M_{critica}$ delimits in the "reduced-mass-flow rate/compression ratio" plane a portion of the useful area of the operating range of the turbocharger 12 that is hereinafter referred to as the "critical area," as while remaining within the useful area it represents the area substantially close to the attainment of sonic conditions (i.e., substantially close to the "saturation" line 35). The critical zone is characterized by the collapse of the efficiency of the compressor 14 and by a high instability of the speed of the turbocharger 12, which may dangerously accelerate.

Figure 5:
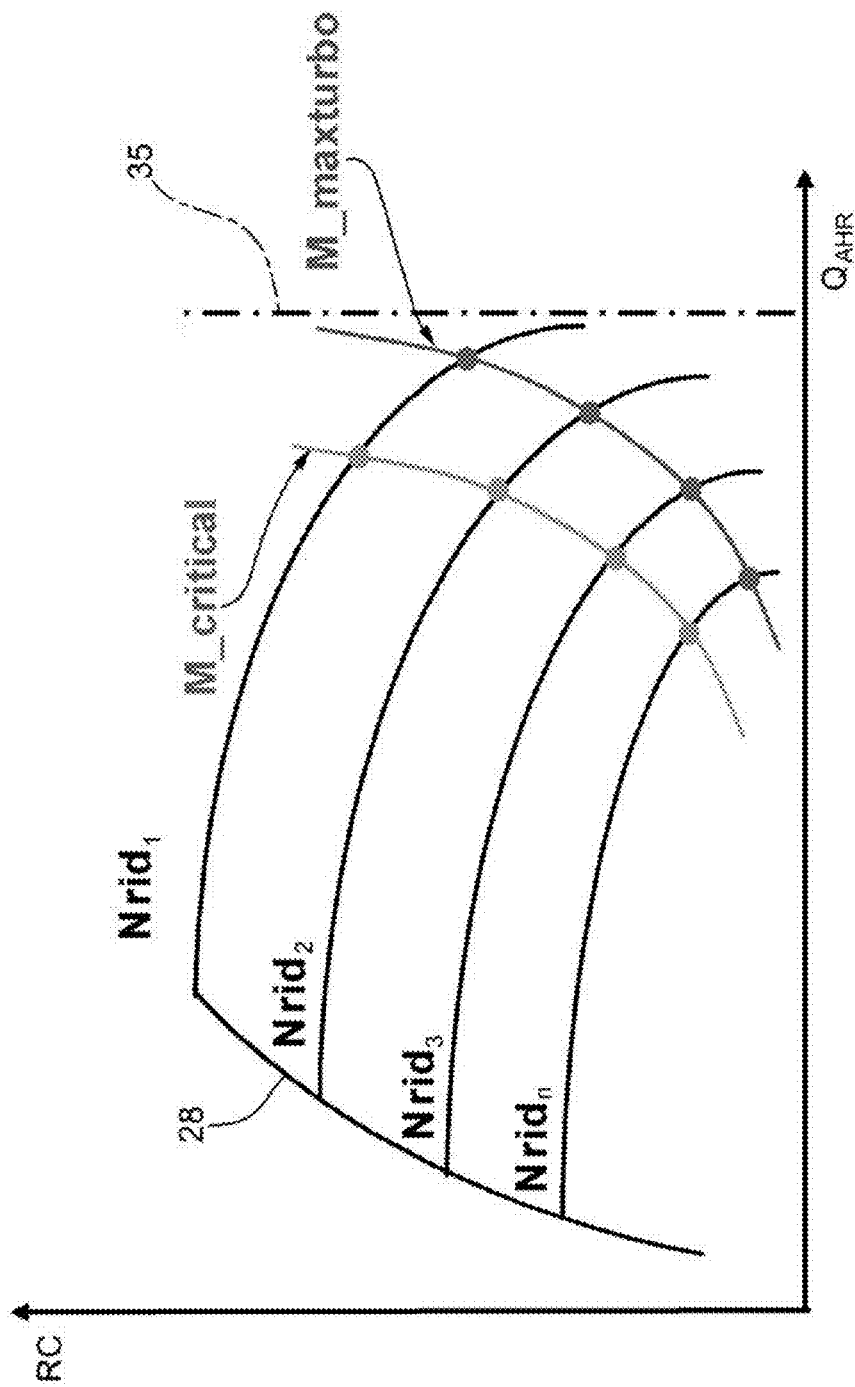

The critical threshold $M_{critica}$ is variable depending on the reduced limit speed $N_{tcR}$ (as best illustrated in FIG. 5).

To reduce the instability characterizing the critical zone, the electronic-control unit 21 is arranged to filter the current reduced-mass-flow rate $Q_{AHR}$ used to limit the pressure target downstream of the compressor 14. Similarly, the electronic-control unit 21 is arranged to filter the pressure target downstream of the compressor 14. The filtering capacity of the current reduced-mass-flow rate $Q_{AHR}$ used to limit the pressure target downstream of the compressor 14 and the target pressure downstream of the compressor 14 is capable of reducing the dynamics of the abovementioned variables. According to an embodiment, the filtering is achieved through a low pass first order filter.

In the case of reduced-mass-flow rate $Q_{AHR}$ exceeding the critical threshold $M_{critica}$, the control unit 21 is then prepared for filtering with a low pass first order type filter both the current reduced-mass-flow rate $Q_{AHR}$, and the target pressure downstream of the compressor 14.

According to an embodiment, the control unit is configured to determine a security threshold $M_{max\_turbo}$ of the reduced-mass-flow rate $Q_{AHR}$. As best illustrated in FIG. 4, the security threshold $M_{max\_turbo}$ delimits a portion to avoid of the critical area, as it is the substantially closest to achieve sonic conditions (i.e., substantially closer to the "saturation" line 35) and represents a reduced-mass-flow rate $Q_{AHR}$ beyond which the turbocharger 12 should not go.

The security threshold $M_{max\_turbo}$ is greater than the critical threshold $M_{critica}$. Furthermore, the security threshold $M_{max\_turbo}$ varies depending on the reduced limit speed $N_{tcR}$ (as best illustrated in FIG. 5).

The electronic-control unit 21 is configured to impose that the reduced-mass-flow rate $Q_{AHR}$ of the compressor 14 is lower than the security threshold $M_{max\_turbo}$ of the reduced-mass-flow rate $Q_{AHR}$.

According to a further variant, the electronic-control unit 21 is arranged to determine a security threshold $N_{max\_turbo}$ of the speed of the supercharged internal-combustion engine 1. The security threshold $N_{max\_turbo}$ of the speed of the supercharged internal-combustion engine 1 is in turn determined as a function of the security threshold $M_{max\_turbo}$ of the reduced-mass-flow rate $Q_{AHR}$.

In particular, the security threshold $N_{max\_turbo}$ of the speed of the supercharged internal-combustion engine 1 is calculated using the following equation:

$$N_{max\_turbo} = M_{max\_turbo} \cdot \sqrt{\frac{T_{o\_rif}}{T_o}} \cdot \frac{P_o}{P_{o\_rif}} \cdot \frac{1}{(m \cdot 30 \cdot N_{cil})}$$

wherein $N_{max\_turbo}$=security threshold of the speed of the supercharged internal-combustion engine 1;
$M_{max\_turbo}$=security threshold of the reduced-mass-flow rate $Q_{AHR}$;
$T_o$=absolute temperature upstream of the compressor 14;
$P_o$=absolute pressure upstream of the compressor 14;
$T_{o\_rif}$=absolute reference temperature;
$P_{o\_rif}$=absolute reference pressure;
$N_{cil}$=number of cylinders 3 of the internal-combustion engine 1; and
M=mass of air drawn for each cylinder 3 of the internal-combustion engine 1.

The security threshold $N_{max\_turbo}$ is used to limit the speed of the supercharged internal-combustion engine 1, so that the current reduced-mass-flow rate $Q_{AHR}$ is lower than the threshold $M_{max\_turbo}$.

According to an embodiment, for the turbocharger 12 a preset speed limit $N_{tc}$ of the turbocharger 12 is set above which the turbocharger 12 is brought into a critical condition; using the preset speed limit $N_{tc}$ of the turbocharger 12 the current reduced speed limit $N_{tcR}$ of the turbocharger 12 is calculated based on the absolute temperature $T_o$ upstream of the compressor 14 using the following equation:

$$N_{tcR} = N_{tc} \cdot \sqrt{\frac{T_{orif}}{T_o}}$$

wherein $N_{tc}$=speed limit of the turbocharger 12;
$N_{tcR}$=reduced speed limit of the turbocharger 12;
$T_o$=absolute temperature upstream of the compressor 14; and
$T_{o\_rif}$=absolute reference temperature.

At the varying of absolute temperature $T_o$ upstream of the compressor 14 and at the same preset-limit speed $N_{tc}$ of the turbocharger 12 the current reduced limit speed $N_{tcR}$ of the turbocharger 12 varies; therefore, the electronic-control unit 21 cyclically determines according to the absolute temperature $T_o$ upstream of the compressor 14 and according to the preset-limit speed $N_{tc}$ of the turbocharger 12 (which always remains constant) the current reduced limit speed $N_{tCR}$ of the turbocharger 12 and according to the current reduced limit speed $N_{tCR}$ of the turbocharger 12 is able to determine the curves 27, 29, 31, 33 to be used. Alternatively, since the preset-limit speed $N_{tc}$ of the turbocharger 12 is constant to simplify the management of the curves 27, 29, 31, 33, the curves 27, 29, 31, 33 themselves may be stored in the electronic-control unit 21 and parameterized according to the absolute temperature $T_o$ upstream of the compressor 14; in this way, the electronic-control unit 21 does not need to calculate the current reduced limit speed $N_{tCR}$ of the turbocharger 12 and, therefore, choose the curves 27, 29, 31, 33 to be used, but simply needs to update the curves 27, 29, 31, 33 as a function of absolute temperature $T_o$ upstream of the compressor 14.

According to what has been described insofar and as shown in FIG. 5, the current reduced speed limit $N_{tCR}$ varies depending on several factors, in particular, on the absolute temperature $T_o$ upstream of the compressor 14.

According to an embodiment, in a preliminary stage of setting and tuning a lower limit speed of the turbocharger 12 and a higher limit speed of the turbocharger 12 are preset (which represents a limit of the turbocharger 12 beyond which is best to not exceed in order to not contract serious breakage or damage to the turbocharger 12 itself). In use, these two values are used to calculate a reduced lower limit speed $N_{rid\_inf}$ of the turbocharger 12 (which is calculated using the formula described above, and varies according to the preset lower limit speed of the turbocharger 12 and the absolute temperature $T_o$ upstream of the compressor 14) and a reduced higher limit speed $N_{rid\_sup}$ of the turbocharger 12 (which is also calculated using the formula described above, is greater than the reduced lower speed limit of the turbocharger 12 and varies according to the preset-limit speed of the turbocharger 12 and of the absolute temperature $T_o$ upstream of the compressor 14). The reduced lower limit speed $N_{rid\_inf}$ of the turbocharger 12 and the reduced higher limit speed $N_{rid\_sup}$ of the turbocharger 12 delimit an overspeed area in the "reduced-mass-flow rate/compression ratio" plane. During the life-span of the turbocharger 12 it is often the case that the overspeed area moves in the "reduced-mass-flow rate/compression ratio" plane (for example, due to the influence of the absolute temperature $T_o$ upstream of the compressor 14). In use, once calculated the current reduced speed limit, the electronic-control unit 21 is arranged to control the turbocharger 12 to bring the reduced speed limit to a value lower than the reduced lower limit speed $N_{rid\_inf}$ every time in which a value of the current reduced limit speed included within the overspeed interval is detected.

Figure 6:
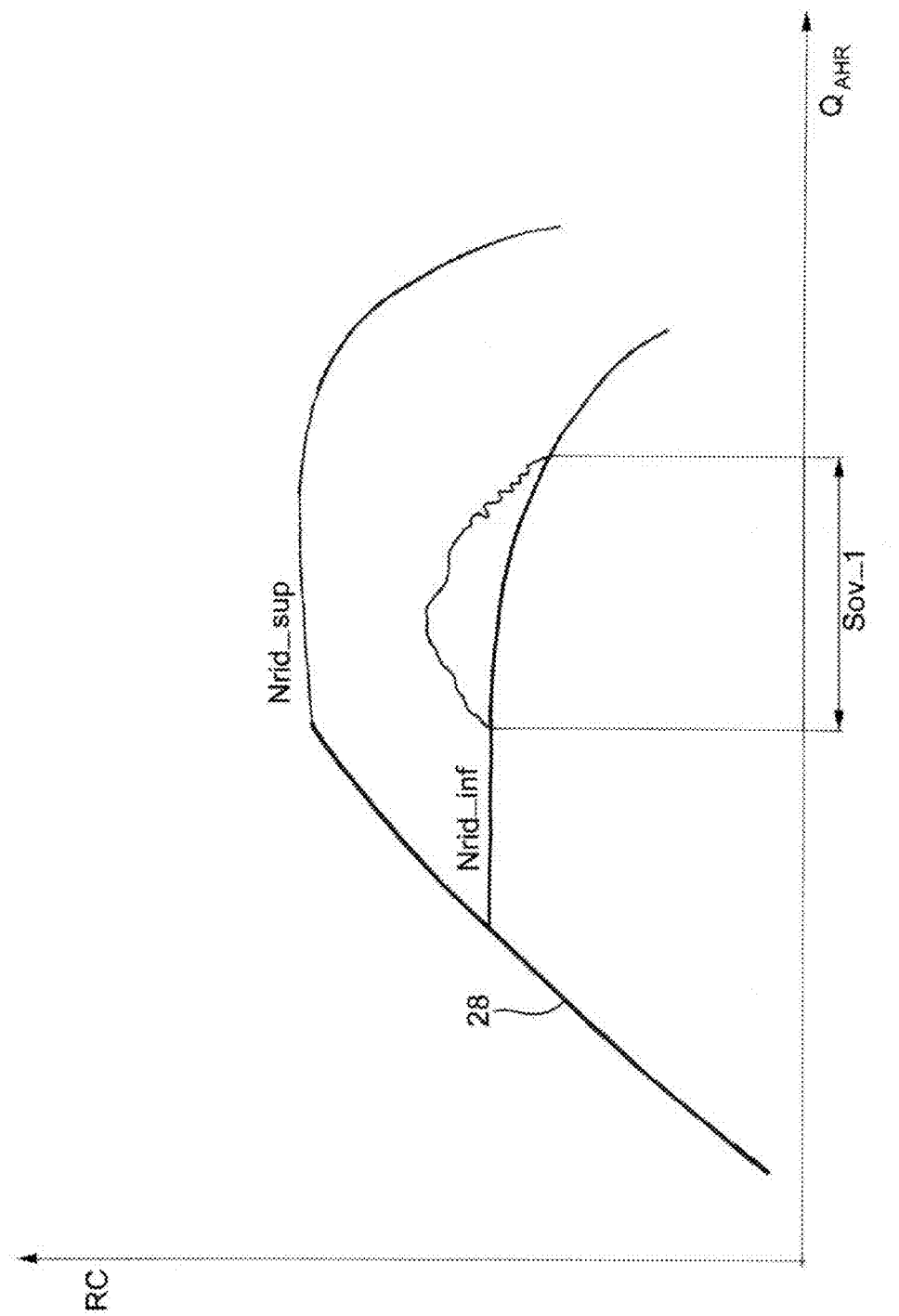

In particular, it is established at a preliminary stage of setting and tuning a first threshold value $S_{OV\_1}$ and the turbocharger 12 is controlled to bring the reduced speed limit to a value less than the reduced lower limit speed $N_{rid\_inf}$ once a time interval has passed substantially equal to the first threshold value $S_{OV\_1}$ from the moment a value of the current reduced speed limit included within the overspeed interval (as shown in FIG. 6) is detected. In other words, when the electronic-control unit 21 detects a current reduced limit speed within the overspeed interval, a timer is initialized to report the reduced limit speed to a value lower than the reduced lower limit speed $N_{rid\_inf}$ once a time interval has passed substantially equal to the first threshold value $S_{OV\_1}$ (for example, by a soft fitting).

According to an embodiment, at a preliminary stage of setting and tuning a second threshold value $S_{OV\_2}$ is established. The electronic-control unit 21 is arranged to initialize a timer every time that the reduced limit speed descends below the reduced lower limit speed $N_{rid\_inf}$ and inhibits the operation of the turbocharger 12 within the overspeed region for a time interval of duration value substantially equal to the second threshold $S_{OV\_2}$.

The first threshold value $S_{OV\_1}$ and the threshold value $S_{OV\_2}$ are variable according to the state of ageing and wear on the supercharger 12.

According to an embodiment, the control unit 21 is capable of storing the total time spent within the overspeed area and inhibit the operation of the turbocharger 12 in the overspeed area for the remaining useful life of the turbocharger 12 itself once the total time is substantially equal to a safe limit value (determined in a preliminary stage of setting and tuning).

Moreover, according to an embodiment, the control unit 21 is adapted to inhibit the operation of the turbocharger 12 in the overspeed area when the reduced-mass-flow rate $Q_{AHR}$ is above the critical threshold $M_{critica}$.

According to an embodiment, the threshold $S_{OV\_2}$ can vary according to the frequency of the most recent overspeed. In other words, the threshold $S_{OV\_2}$ is greater the more frequently a current reduced limit speed is detected within the overspeed range. The threshold $S_{OV\_2}$ may for example be calculated as follows:

$$S_{OV\_2} = f((\Sigma t_{over\_speed} - S_{OV\_3})/\text{timer})$$

wherein $S_{OV\_3}$ is an operator to decrease (e.g., K*timer with K that represents a preset coefficient), while the summation of time spent within the overspeed interval and the timer are initialized at each trip of the supercharged internal-combustion engine 1 (i.e., typically for each start/stop cycle of the supercharged internal-combustion engine 1) and the timer is started at the first overspeed. The function is, for example, in increase.

According to a further variation, for each trip of the supercharged internal-combustion engine 1 (i.e., for each start/stop cycle the supercharged internal-combustion engine 1 itself). According to another embodiment, as soon as the control unit 21 verifies the operation condition within the overspeed area, a counter C of the time spent in overspeed is initialized. The counter C can be calculated using the following formula:

$$C = k1 * \Sigma t_{over\_speed} - k2 * \Sigma t_{NOT\_over\_speed}$$

wherein K1 and K2 are predetermined coefficients in a preliminary phase, while the summation of time spent within the overspeed interval and the summation of time spent outside the area of overspeed are initialized at each trip of the supercharged internal-combustion engine 1.

According to an embodiment, in a preliminary phase of setting and tuning a fourth threshold value $S_{OV\_4}$ is established, which is compared with the counter C of the time spent in overspeed. In the case of counter C greater than or substantially equal to the fourth threshold value $S_{OV\_4}$, the control unit 21 is adapted to inhibit the operation of the turbocharger 12 within the overspeed area. On the contrary, in case of counter C lower than the fourth threshold value $S_{OV\_4}$, the control unit 21 is set to allow the operation of the turbocharger 12 within the overspeed area (for example, with the assistance of a hysteresis operator).

According to an embodiment, the control unit 21 utilizes the current pressure of the turbocharger 12 instead of the current reduced limit speed to recognize the current operation in the overspeed area.

The control method is inexpensive and simple to implement. Also, the control method does not use a high computing power of the electronic-control unit 21. Furthermore, the control method does not require the installation of additional components (in particular, sensors or actuators) with respect to those already present in a modern internal-combustion engine. In addition, the control method ensures that the operating range of the turbocharger remains within the useful area substantially close to the "saturation" line, but without reaching the sonic block.

It should be appreciated by those having ordinary skill in the related art that the control method has been described above in an illustrative manner. It should be so appreciated also that the terminology that has been used above is intended to be in the nature of words of description rather than of limitation. It should be so appreciated also that many modifications and variations of the control method are possible in light of the above teachings. It should be so appreciated also that, within the scope of the appended claims, the control method may be practiced other than as specifically described above.

What is claimed is:

1. A method for controlling an internal-combustion engine (1) supercharged by a turbocharger (12) provided with a turbine (13) and compressor (14), said control method comprising steps of:

determining a current reduced-mass-flow rate (QAHR) of the compressor (14);

determining a safety threshold (Mmax_turbo) of the reduced-mass-flow rate (QAHR) that delimits in a "reduced-mass-flow rate/compression ratio" plane an area substantially close to achievement of sonic conditions; and imposing that the current reduced-mass-flow rate (QAHR) has to be lower than a safety threshold (Mmax_turbo) of the reduced-mass-flow rate (QAHR).

2. A control method as set forth in claim 1, wherein said control method comprises further steps of:

establishing a predetermined limit speed (N) of the compressor (14);

calculating a reduced limit speed (NR) of the compressor (14) by using the predetermined limit speed (N) and an absolute temperature (To) upstream of the compressor (14); and determining the safety threshold (Mmax_turbo) of the reduced-mass-flow rate (QAHR) according to the reduced limit speed (NR).

3. A control method as set forth in claim 1, wherein said control method comprises further steps of:

determining a safety threshold (Nmax_turbo) of speed of the internal-combustion engine (1) according to the safety threshold (Mmax_turbo) of the reduced-mass-flow rate (QAHR); and imposing that the speed has to be lower than the safety threshold (Nmax_turbo) of the speed.

\* \* \* \* \*